(12) United States Patent
DeJana et al.

(10) Patent No.: US 8,843,621 B2
(45) Date of Patent: Sep. 23, 2014

(54) EVENT PREDICTION AND PREEMPTIVE ACTION IDENTIFICATION IN A NETWORKED COMPUTING ENVIRONMENT

(75) Inventors: Ryan G. DeJana, Longmont, CO (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/280,406

(22) Filed: Oct. 25, 2011

(65) Prior Publication Data

US 2013/0103823 A1    Apr. 25, 2013

(51) Int. Cl.
| | | |
|---|---|---|
| G06F 15/173 | (2006.01) | |
| H04L 12/24 | (2006.01) | |
| G06F 11/00 | (2006.01) | |
| G06F 17/30 | (2006.01) | |
| H04L 29/08 | (2006.01) | |
| G06Q 50/00 | (2012.01) | |
| G06Q 10/04 | (2012.01) | |

(52) U.S. Cl.
CPC .............. *G06Q 10/04* (2013.01); *H04L 41/147* (2013.01); *G06F 11/008* (2013.01); *G06F 17/30864* (2013.01); *H04L 41/5025* (2013.01); *H04L 67/2847* (2013.01); *G06Q 50/01* (2013.01)
USPC .......................................... 709/224; 705/412

(58) Field of Classification Search
None
See application file for complete search history.

(56) References Cited

U.S. PATENT DOCUMENTS

| | | | |
|---|---|---|---|
| 7,861,111 B2 | 12/2010 | Doerr | |
| 2006/0265489 A1* | 11/2006 | Moore | 709/223 |
| 2008/0034030 A1 | 2/2008 | Toohey | |
| 2009/0070628 A1* | 3/2009 | Gupta et al. | 714/26 |
| 2010/0057641 A1* | 3/2010 | Boss et al. | 705/412 |

(Continued)

FOREIGN PATENT DOCUMENTS

| | | |
|---|---|---|
| WO | 0007102 A2 | 2/2000 |
| WO | 0154008 A2 | 7/2001 |

OTHER PUBLICATIONS

Li, Juan, et al., "Community-Based Cloud for Emergy Management", Jun. 2011, IEEE Porc. of the 2011 6th International Conference on System of Systems Engineering, p. 55-60.*

(Continued)

*Primary Examiner* — Jason K. Gee
*Assistant Examiner* — Maung Lwin
(74) *Attorney, Agent, or Firm* — William E. Schiesser; Keohane & D'Alessandro, PLLC

(57) ABSTRACT

Embodiments of the present invention relate to an approach for using electronic feeds (e.g., online news feeds, social media resources/websites, etc.) to predict potentially harmful events and take preemptive measures/actions to minimize and/or avoid loss. In a typical embodiment, a set of electronic feeds (e.g., news feeds and/or social networking website feeds) is accessed. A query is then issued against the set of feeds based on a set of search criteria pertaining to a possible event having a potential to adversely affect the networked computing environment. A set of results is received in a computer memory medium of the networked computing environment. It may then be determined whether at least one property of the set of results (e.g., a quantity of 'hits') meets one or more predetermined event criteria (e.g., a predetermined threshold).

25 Claims, 5 Drawing Sheets

(56) References Cited

U.S. PATENT DOCUMENTS

| | | | |
|---|---|---|---|
| 2011/0055161 A1 | 3/2011 | Wolfe | |
| 2011/0078794 A1* | 3/2011 | Manni et al. | 726/23 |
| 2011/0106927 A1 | 5/2011 | Carter et al. | |
| 2011/0145185 A1* | 6/2011 | Wang et al. | 706/52 |
| 2011/0161297 A1 | 6/2011 | Parab | |
| 2011/0173035 A1* | 7/2011 | Isom | 705/7.11 |

OTHER PUBLICATIONS

Adam Tucker, UK Search Report, Application No. GB1217766.3, Dated Feb. 1, 2013, 5 pages.

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Li, J. et al., "Community-Based Cloud for Emergency Management", sameekhan.org, 6 pages, Proc. of 2011, 6th Int. Conf. on system of system engineering, Jun. 2011.

Madrigal, A., "Does Anne Hathaway News Drive Berkshire Hathaway's Stock?", The Atlantic, Mar. 18, 2011, 3 pages. http://www.tehatlantic.com/technology/print/2011/03/does-anne- . . . .

Twitter account that tweets about disasters. No authors cited, 6 pages. http://twitter.com/#!/disasteralerts, (Aug. 2011).

Prutsalis, M., "Use of Twitter as an Emergency Notification Service", Aug. 13, 2011, 7 pages. http://living-prepared.com/2009/08/13/use-of-twitter-as-an-emergency-notification-service/.

* cited by examiner

EVENT PREDICTION AND PREEMPTIVE ACTION IDENTIFICATION IN A NETWORKED COMPUTING ENVIRONMENT

TECHNICAL FIELD

In general, the present invention relates to event prediction and preemptive recovery (e.g., disaster recovery) in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

In networked computing environments such as cloud computing environments, there may be a number of resources available for use. One type of such resource is a data center that multiple users may utilize. A user may pick a data center based on multiple of factors including: cost, distance from user, network speed, available storage capacity, etc. In addition, the advent of social media has resulted in news rapidly spreading across the globe. Now, instead of individual news organizations being the sole sources of news, individual web users can disseminate information as the users become aware of it. Challenges may exist, however, in fully leveraging the efficiency and widespread nature of such sources. Specifically, while there is a large quantity of potential sources of information, it may be difficult to aggregate such information such that it is useful for taking preemptive/preventive measures.

SUMMARY

In general, embodiments of the present invention relate to an approach for using electronic feeds (e.g., online news feeds, social media resources/websites, etc.) to predict potentially harmful events and take preemptive measures/actions to minimize and/or avoid loss. In a typical embodiment, a set of electronic feeds (e.g., news feeds and/or social networking website feeds) is accessed. A query is then issued against the set of feeds based on a set of search criteria pertaining to a possible event having a potential to adversely affect the networked computing environment. In response to the query being issued, a set of results is received in a computer memory medium of the networked computing environment. It may then be determined whether at least one property of the set of results (e.g., a quantity of 'hits') meets one or more predetermined event criteria (e.g., a predetermined threshold). Responsive to the at least one property being met, a set of remedial actions to be taken to address the possible event may be identified and implemented prior to an occurrence of the possible event.

A first aspect of the present invention provides a computer-implemented method for event prediction and preemptive remediation based on electronic feeds in a networked computing environment, comprising: accessing a set of electronic feeds; issuing a query against the set of feeds based on a set of search criteria pertaining to a possible event having a potential to adversely affect the networked computing environment; responsive to the query being issued, receiving a set of results in a computer memory medium; determining whether at least one property of the set of results meets one or more predetermined event criteria; and responsive to the at least one property of the set of results meeting the one or more predetermined event criteria, identifying a set of remedial actions to be taken to address the possible event.

A second aspect of the present invention provides a system for event prediction and preemptive remediation based on electronic feeds in a networked computing environment, comprising: a memory medium comprising instructions; a bus coupled to the memory medium; and a processor coupled to the bus that when executing the instructions causes the system to: access a set of electronic feeds; issue a query against the set of feeds based on a set of search criteria pertaining to a possible event having a potential to adversely affect the networked computing environment; responsive to the query being issued, receive a set of results in a computer memory medium; determine whether at least one property of the set of results meets one or more predetermined event criteria; and responsive to the at least one property of the set of results meeting the one or more predetermined event criteria, identify a set of remedial actions to be taken to address the possible event.

A third aspect of the present invention provides a computer program product for event prediction and preemptive remediation based on electronic feeds in a networked computing environment, the computer program product comprising a computer readable storage media, and program instructions stored on the computer readable storage media, to: access a set of electronic feeds; issue a query against the set of feeds based on a set of search criteria pertaining to a possible event having a potential to adversely affect the networked computing environment; responsive to the query being issued, receive a set of results in a computer memory medium; determine whether at least one property of the set of results meets one or more predetermined event criteria; and responsive to the at least one property of the set of results meeting the one or more predetermined event criteria, identify a set of remedial actions to be taken to address the possible event.

A fourth aspect of the present invention provides a method for deploying a system for event prediction and preemptive remediation based on electronic feeds in a networked computing environment, comprising: providing a computer infrastructure being operable to: access a set of electronic feeds; issue a query against the set of feeds based on a set of search criteria pertaining to a possible event having a potential to adversely affect the networked computing environment; responsive to the query being issued, receive a set of results in a computer memory medium; determine whether at least one property of the set of results meets one or more predetermined event criteria; and responsive to the at least one property of the set of results meeting the one or more predetermined event criteria, identify a set of remedial actions to be taken to address the possible event.

BRIEF DESCRIPTION OF THE DRAWINGS

These and other features of this invention will be more readily understood from the following detailed description of the various aspects of the invention taken in conjunction with the accompanying drawings in which.

Figure 1:
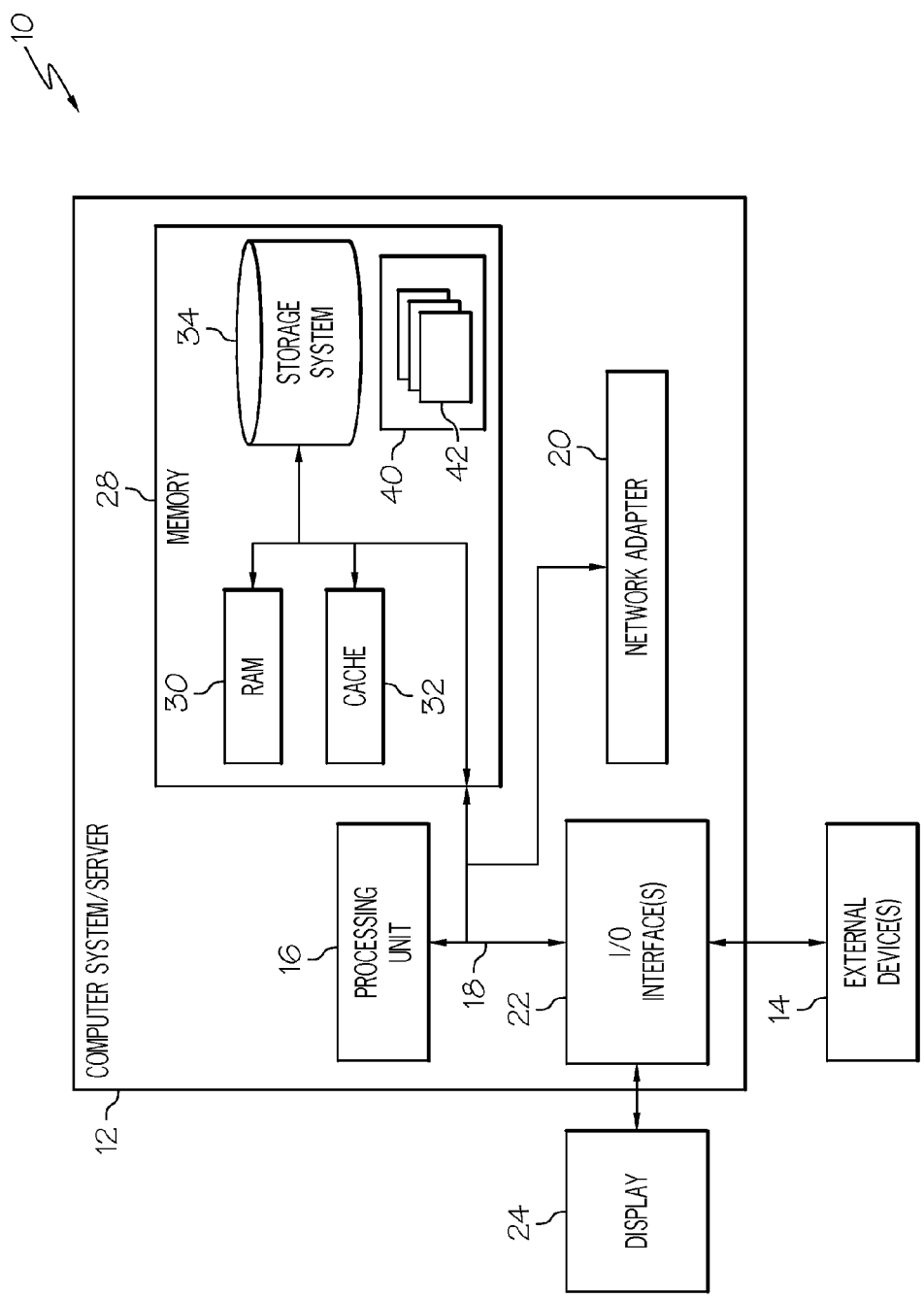
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention relate to an approach for using electronic feeds (e.g., online news feeds, social media resources/websites, etc.) to predict potentially harmful events and take preemptive measures/actions to minimize and/or avoid loss. In a typical embodiment, a set of electronic feeds (e.g., news feeds and/or social networking website feeds) is accessed. A query is then issued against the set of feeds based on a set of search criteria pertaining to a possible event having a potential to adversely affect the networked computing environment. In response to the query being issued, a set of results is received in a computer memory medium of the networked computing environment. It may then be determined whether at least one property of the set of results (e.g., a quantity of 'hits') meets one or more predetermined event criteria (e.g., a predetermined threshold). Responsive to the at least one property being met, a set of remedial actions to be taken to address the possible event may be identified and implemented prior to an occurrence of the possible event.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
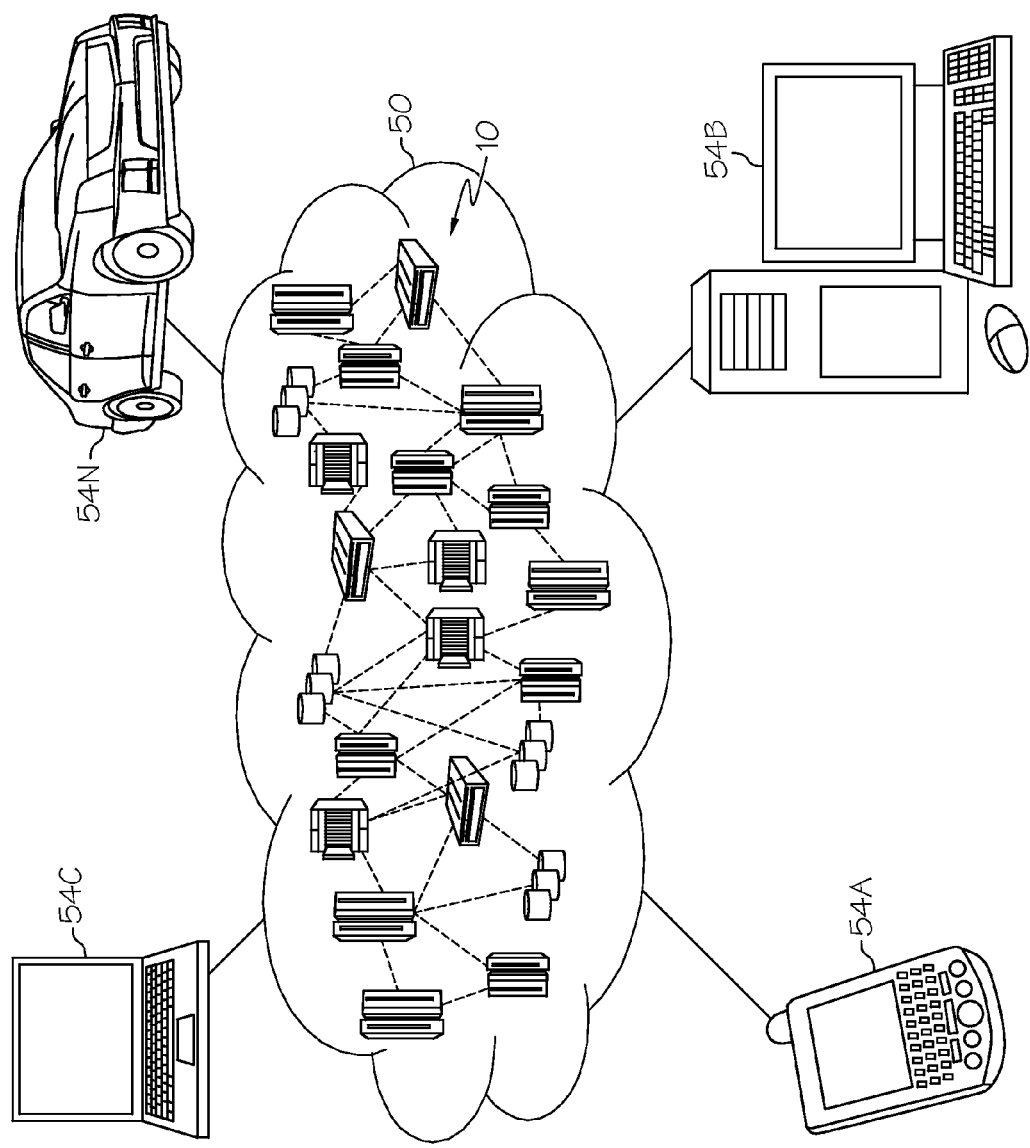
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
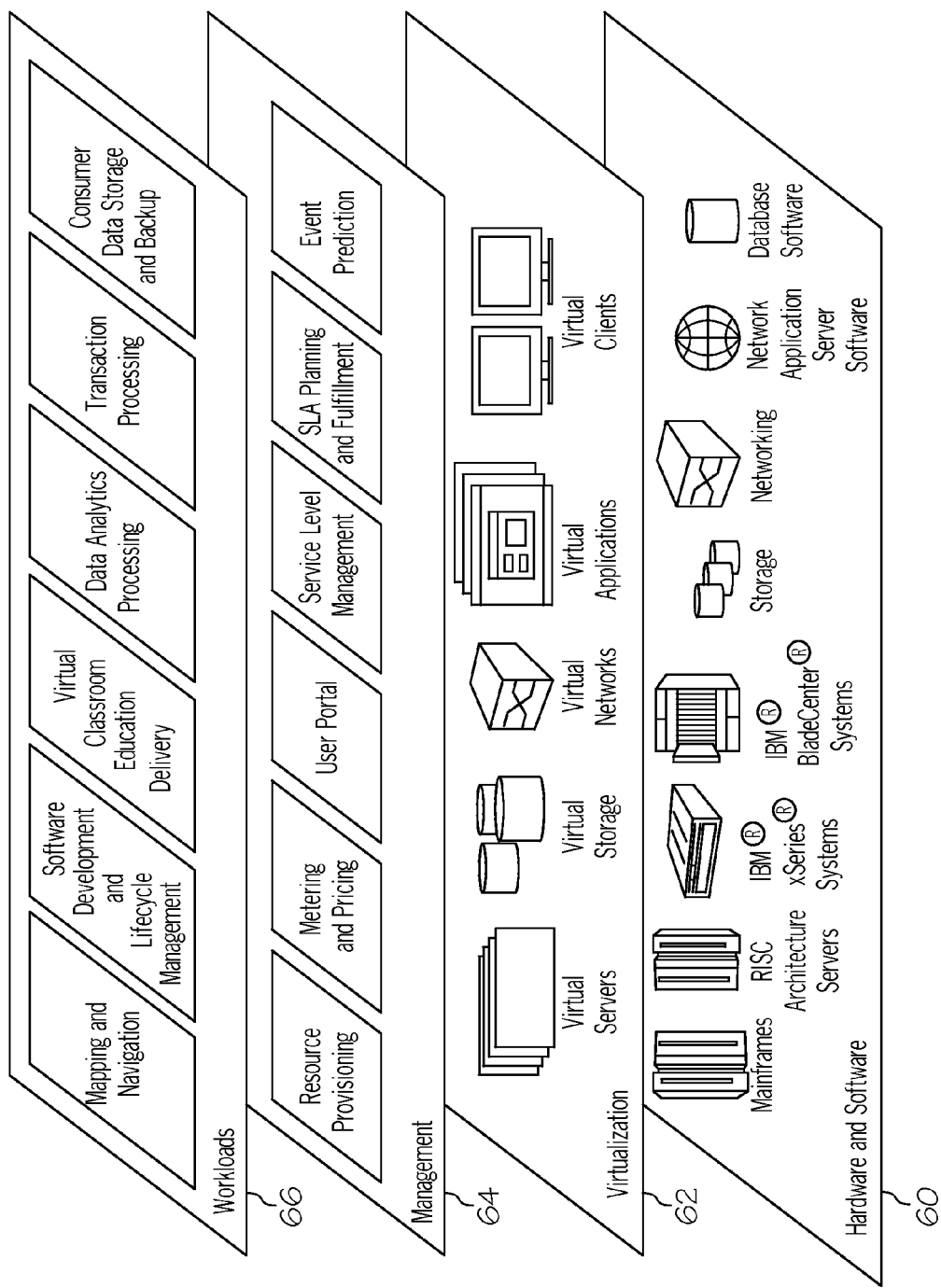
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is event prediction "module", which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the event prediction functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
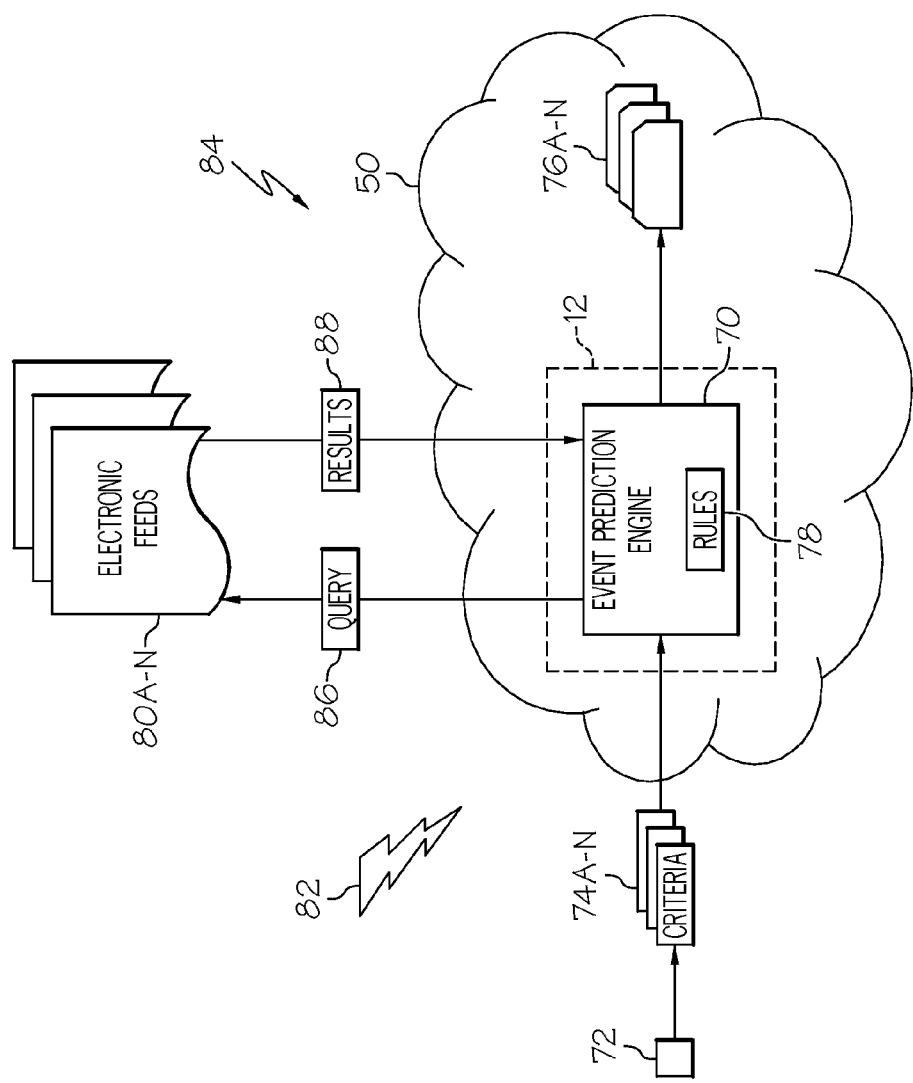
FIG. 4 depicts a system diagram according to an embodiment of the present invention.

Referring now to FIG. 4, a system diagram according to an aspect of the present invention is shown. As depicted, an event prediction engine (engine 70) is shown within networked computing environment 84 (e.g., comprising cloud computing environment 50). In general, engine 70 can be implemented as program 40 on computer system 12 of FIG. 1 and can implement the functions recited herein as depicted in management layer 64 of FIG. 3. In general, engine 70 (in one embodiment) comprises a rules and/or computational engine that processes a set (at least one) of rules 78 and/or performs computations to access electronic news feeds, predict events (e.g., extreme weather events, electrical disturbances, etc.), and identify preemptive actions/measures to avoid data and/or infrastructure loss. Such actions may include, but are not limited to, shifting data centers, evacuating personnel, relocating moveable resources, running data backup operations, etc.

Along these lines, engine 70 may perform multiple functions similar to a general-purpose computer using rules 78. Specifically, among other functions, engine 70 may: access a set electronic feeds 80A-N (e.g., news feeds and/or social networking website feeds); issue a query 86 (e.g., a location-specific query, a time-specific query, or a query based on a common set of social media characteristics) for the set of feeds based on a set of search criteria 74A-N (e.g., provided by a user 72) pertaining to a possible event 82 (e.g., a disaster-related event such as disaster-related event, a weather-related event, a geologic event, a biological epidemic-related event, an electrical grid failure event, a transportation infrastructure failure event, or a human-initiated malicious action event) having a potential to adversely affect the networked computing environment 84 (e.g., which may comprise one or more cloud computing environments 50); responsive to the query being issued, receive a set of results 88 in a computer memory medium (e.g., memory 28 of FIG. 1); determine whether at least one property (e.g., a quantity) of the set of results 88 meets one or more predetermined event criteria (e.g., exceeds a predetermined threshold); responsive to the at least one property of the set of results meeting the one or more predetermined event criteria, identify a set of remedial actions 76A-N to be taken to address the possible event 82; and/or implement at least one of the set of remedial actions 76A-N prior to an occurrence of the possible event.

ILLUSTRATIVE EXAMPLE

This section discloses one possible approach for implementing the teachings discussed above. It is understood that this section is intended to be illustrative only. As such, the outline set forth below is not intended to be exhaustive of all possible scenarios/implementations of the embodiments of the present invention.
1. Engine 70 monitors electronic feeds 80A-N:
    A. Search engine search terms;
    B. Status changes;
    C. News articles; and
    D. Social networking sites.
2. A particular set of search terms input may be given priority/weight:
    A. "Natural disaster" terms:
        1. Earthquake;
        2. Tsunami;
        3. Hurricane;
        4. Volcano;
        5. Tornado;
        6. Flood;
        7. Etc.
    B. Event terms:
        1. Attack;
        2. Pandemic;
        3. Outage;
        4. Etc.
3. The inputted search terms may be analyzed with date/time and/or location-specific attributes (e.g., the earthquake is expected to hit in 1 hour" in location "A").
4. A predetermined threshold is set:
    A. Quantity of messages/hits (e.g., only initiate disaster recovery sequence if the number of predictions reaches 10,000); and
    B. Reliability of source.
5. Upon the predetermined threshold being met and/or exceeded:
    A. Optionally, an administrator can initiate the disaster recovery after being alerted the threshold has been met.
    B. Different recovery steps can be set at different thresholds. For example, the following strategy could be implemented: After 10,000 hits, back up higher priority resources. After 100,000 hits, back up the remaining resources. This would allow for recovery in stages ensuring the higher priority items are handled regardless of whether or not the data center becomes affected.
    C. The system may also determine whether or not one of more data centers will be affected:
        1. If a data center is determined to be affected:
            a. Alert cloud users;
            b. Alert potentially impacted customers;
            c. Discontinue new cloud resource requests (e.g., no longer allow users to provision instances to this data center);
            d. Begin preemptive recovery:
                1. Preemptive recovery will attempt to back up resources within the affected data center;
                2. Attach a priority to resources:
                    1. Higher priority for those resources not already backed up on another data center;
                    2. Higher priority for those resources that are more active (e.g., a user might not have spent a lot of time configuring a cloud resource if it is has only been up for one day versus one that has been running for two months); and
                    3. Higher priority for those resources belonging to customers with backup/recovery insurance.
                3. Priority could be altered based on the predicted time until impact (e.g., one hour until the earthquake is expected to hit).
            e. Take necessary steps to salvage hardware:
                1. Turn off power to hardware;
                2. Seal the room to protect against the elements (wind, fire, water, etc.);
                3. Etc.
        2. If a data center is not determined to be affected:
            a. The system can send back-up information to this data center.
6. The system continues to analyze and the system may repeat the process at step 1 above.

Figure 5:
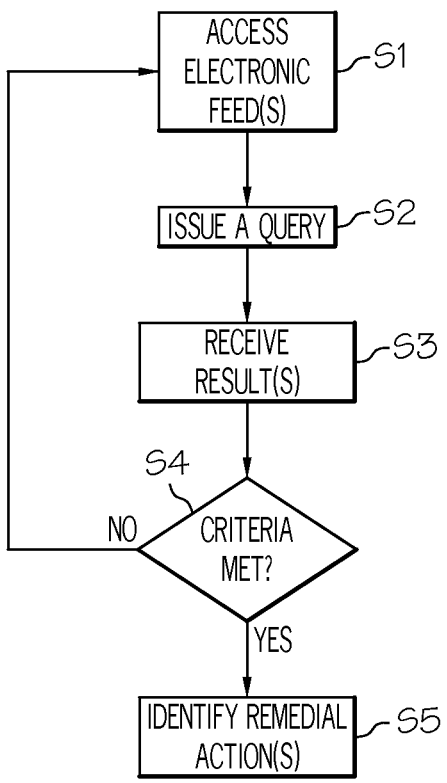
FIG. 5 depicts a method flow diagram according to an embodiment of the present invention.

Referring now to FIG. 5, a method flow diagram according to an embodiment of the present invention is shown. As depicted, in step S1, a set of electronic feeds is accessed. In step S2, a query is issued against the set of feeds based on a set of search criteria pertaining to a possible event having a potential to adversely affect the networked computing environment. In step S3, responsive to the query being issued, a set of results is received in a computer memory medium. In step S4, it is determined whether at least one property of the set of results meets one or more predetermined event criteria. If not, the process can be return to step S1. If the at least one property of the set of results met the one or more predetermined event criteria, a set of remedial actions to be taken to address the possible event will be identified in step S5.

While shown and described herein as an event prediction and preemptive action solution, it is understood that the invention further provides various alternative embodiments. For example, in one embodiment, the invention provides a computer-readable/useable medium that includes computer program code to enable a computer infrastructure to provide event prediction and preemptive action functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide event prediction and preemptive action functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for event prediction and preemptive action. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for event prediction and preemptive remediation based on electronic feeds in a networked computing environment, comprising:

accessing a set of electronic feeds;

issuing a query against the set of feeds based on a set of search criteria pertaining to a possible event having a potential to adversely affect the networked computing environment;

responsive to the query being issued, receiving a set of results in a computer memory medium;

determining whether at least one property of the set of results meets one or more predetermined event criteria;

responsive to the at least one property of the set of results meeting the one or more predetermined event criteria, identifying a set of remedial actions to be taken to address the possible event;

assigning a priority to resources in the networked computing environment based on an algorithm accounting for whether each of the resources has been previously backed up, a level of activity of each of the resources, and whether each of the resources has recovery insurance;

dynamically changing the assigned priorities based on a predicted time until an occurrence of the possible event; and applying the set of remedial actions to the set of resources based on the assigned priorities at a time of the occurrence of the possible event.

2. The computer-implemented method of claim 1, the set of electronic feeds being accessed via a set of social media websites.

3. The computer-implemented method of claim 1, the possible event comprising a disaster-related event, and the set of remedial actions comprising preemptive disaster recovery actions.

4. The computer-implemented method of claim 3, the disaster-related event pertaining to at least one of the following: a weather-related event, a geologic event, a biological epidemic-related event, an electrical grid failure event, a transportation infrastructure failure event, or a human-initiated malicious action event.

5. The computer-implemented method of claim 1, the set of search criteria comprising a set of keywords related to the possible event.

6. The computer-implemented method of claim 1, the query comprising at least one of the following: a location-specific query, a time-specific query, or a query based on a common set of social media characteristics.

7. The computer-implemented method of claim 1, the set of remedial actions pertaining to infrastructure or individuals associated with the networked computing environment and having a potential to be affected by the possible event.

8. The computer-implemented method of claim 1, further comprising implementing at least one of the set of remedial actions prior to an occurrence of the possible event.

9. A system for event prediction and preemptive remediation based on electronic feeds in a networked computing environment, comprising:

a memory medium comprising instructions;

a bus coupled to the memory medium; and a processor coupled to the bus that when executing the instructions causes the system to:

access a set of electronic feeds;

issue a query against the set of feeds based on a set of search criteria pertaining to a possible event having a potential to adversely affect the networked computing environment;

responsive to the query being issued, receive a set of results in a computer memory medium;

determine whether at least one property of the set of results meets one or more predetermined event criteria;

responsive to the at least one property of the set of results meeting the one or more predetermined event criteria, identify a set of remedial actions to be taken to address the possible event;

assign a priority to resources in the networked computing environment based on a level of activity of each of the resources;

dynamically change the assigned priorities based on a predicted time until an occurrence of the possible event; and apply the set of remedial actions to the set of resources based on the assigned priorities at a time of the occurrence of the event.

10. The system of claim 9, the set of electronic feeds being accessed via a set of social media websites.

11. The system of claim 9, the possible event comprising a disaster-related event, and the set of remedial actions comprising preemptive disaster recovery actions.

12. The system of claim 11, the disaster-related event pertaining to at least one of the following: a weather-related event, a geologic event, a biological epidemic-related event, an electrical grid failure event, a transportation infrastructure failure event, or a human-initiated malicious action event.

13. The system of claim 9, the set of search criteria comprising a set of keywords related to the possible event.

14. The system of claim 9, the query comprising at least one of the following: a location-specific query, a time-specific query, or a query based on a common set of social media characteristics.

15. The system of claim 9, the set of remedial actions pertaining to infrastructure or individuals associated with the networked computing environment and having a potential to be affected by the possible event.

16. The system of claim 9, the memory medium further comprising instructions for causing the system to implement at least one of the set of remedial actions prior to an occurrence of the possible event.

17. A computer program product for event prediction and preemptive remediation based on electronic feeds in a networked computing environment, the computer program product comprising a non-transitory computer readable storage media, and program instructions stored on the non-transitory computer readable storage media, to:

access a set of electronic feeds;

issue a query against the set of feeds based on a set of search criteria pertaining to a possible event having a potential to adversely affect the networked computing environment;

responsive to the query being issued, receive a set of results in a computer memory medium;

determine whether at least one property of the set of results meets one or more predetermined event criteria;

responsive to the at least one property of the set of results meeting the one or more predetermined event criteria, identify a set of remedial actions to be taken to address the possible event;

assign a priority to resources in the networked computing environment based on whether each of the resources has recovery insurance;

dynamically change the assigned priorities based on a predicted time until an occurrence of the possible event; and apply the set of remedial actions to the set of resources based on the assigned priorities at a time of the occurrence of the event.

18. The computer program product of claim 17, the set of electronic feeds being accessed via a set of social media websites.

19. The computer program product of claim 17, the possible event comprising a disaster-related event, and the set of remedial actions comprising preemptive disaster recovery actions.

20. The computer program product of claim 19, the disaster-related event pertaining to at least one of the following: a weather-related event, a geologic event, a biological epidemic-related event, an electrical grid failure event, a transportation infrastructure failure event, or a human-initiated malicious action event.

21. The computer program product of claim 17, the set of search criteria comprising a set of keywords related to the possible event.

22. The computer program product of claim 17, the query comprising at least one of the following: a location-specific query, a time-specific query, or a query based on a common set of social media characteristics.

23. The computer program product of claim 17, the set of remedial actions pertaining to infrastructure or individuals associated with the networked computing environment and having a potential to be affected by the possible event.

24. The computer program product of claim 17, the memory medium further comprising instructions for causing the system to implement at least one of the set of remedial actions prior to an occurrence of the possible event.

25. A method for deploying a system for event prediction and preemptive remediation based on electronic feeds in a networked computing environment, comprising:

providing a computer infrastructure being operable to:

access a set of electronic feeds;

issue a query against the set of feeds based on a set of search criteria pertaining to a possible event having a potential to adversely affect the networked computing environment;

responsive to the query being issued, receive a set of results in a computer memory medium;

determine whether at least one property of the set of results meets one or more predetermined event criteria;

responsive to the at least one property of the set of results meeting the one or more predetermined event criteria, identify a set of remedial actions to be taken to address the possible event;

assign a priority to resources in the networked computing environment based on an algorithm accounting for whether each of the resources has been previously backed up, a level of activity of each of the resources, and whether each of the resources has recovery insurance;

dynamically change the assigned priorities based on a predicted time until an occurrence of the possible event; and apply the set of remedial actions to the set of resources based on the assigned priorities at a time of the occurrence of the event.

* * * * *